Figure 1:
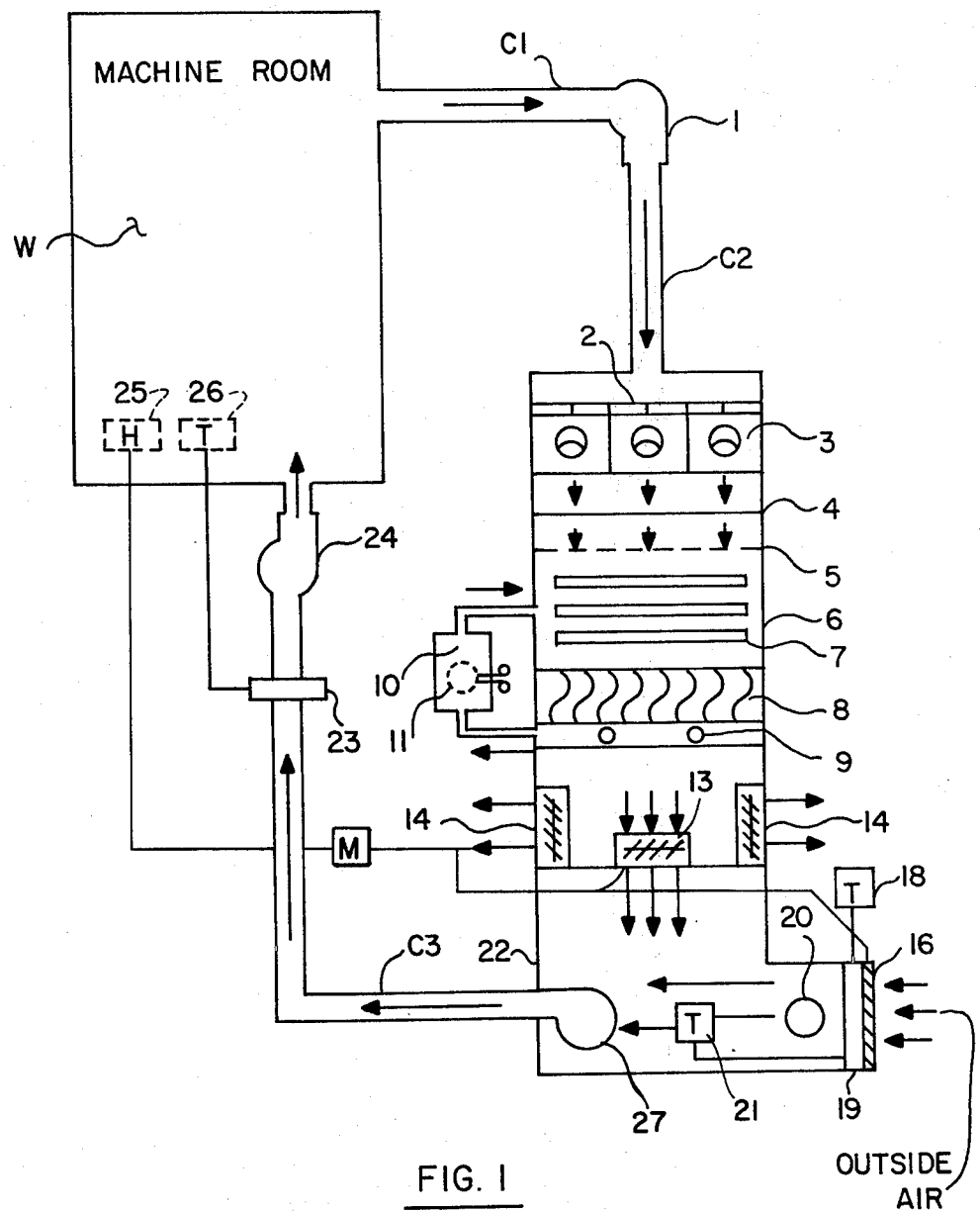

United States Patent [19]

Stockford et al.

[11] 3,963,461
[45] June 15, 1976

[54] HUMIDITY CONTROL SYSTEM WITH APPARATUS FOR REMOVING COMBUSTIBLE DUST PARTICLES

[75] Inventors: William F. Stockford; Joseph M. Gamewell, both of Salisbury, N.C.

[73] Assignee: Gamewell Mechanical, Inc., Salisbury, N.C.

[22] Filed: Sept. 18, 1974

[21] Appl. No.: 506,935

[52] U.S. Cl. .................................... 55/20; 55/84; 55/217; 55/235; 55/258; 55/260; 55/267; 55/321; 55/337; 165/3; 165/60; 261/128; 261/130; 261/133; 261/136; 261/155; 261/DIG. 34
[51] Int. Cl.² .................................... B01D 47/00
[58] Field of Search ................ 55/20, 84, 89, 226, 55/235, 258, 260, 217, 267, 321, 337; 261/128-131, 133, 136, 137, 155, 159, DIG. 34; 165/3, 59, 60

[56] References Cited
UNITED STATES PATENTS

| | | | |
|---|---|---|---|
| 1,568,717 | 1/1926 | Braemer | 261/DIG. 34 |
| 1,751,806 | 3/1930 | Fleisher | 261/DIG. 34 |
| 1,837,797 | 12/1931 | Shipley | 261/DIG. 34 |
| 1,837,798 | 12/1931 | Shipley | 261/DIG. 34 |
| 1,846,875 | 2/1932 | Karr et al. | 261/128 X |
| 1,888,242 | 11/1932 | Sholtes | 261/DIG. 34 |
| 1,938,833 | 12/1933 | Irons, Sr. | 261/DIG. 34 |
| 1,965,078 | 7/1934 | Hewitt et al. | 261/128 X |
| 2,093,691 | 9/1937 | Buder | 261/136 X |
| 2,110,164 | 3/1938 | McDonald | 261/128 |
| 2,110,203 | 3/1938 | Crawford | 261/128 X |
| 2,159,276 | 5/1939 | Lawless | 261/136 X |
| 2,175,469 | 10/1939 | Kaufman | 261/128 X |
| 2,184,613 | 12/1939 | Evleth | 55/258 X |
| 2,189,895 | 2/1940 | Grutzner | 55/258 X |
| 2,203,526 | 6/1940 | Gwathmey | 55/258 X |
| 2,207,774 | 7/1940 | Barthelemy | 55/89 X |
| 2,276,970 | 3/1942 | Hibberd | 261/DIG. 34 |
| 2,712,927 | 7/1955 | Blum | 261/128 X |
| 3,011,966 | 12/1961 | Jahnentz et al. | 55/89 X |
| 3,532,595 | 10/1970 | Arnesjo et al. | 55/89 X |
| 3,753,337 | 8/1973 | Shaw et al. | 55/258 X |
| R20,944 | 12/1938 | Baker | 261/128 X |

*Primary Examiner*—Frank W. Lutter
*Assistant Examiner*—Kathleen J. Prunner

[57] ABSTRACT

Air contaminated with combustible dust particles is removed and subjected to a high density air scrubber which safely removes the fine combustible dust particles from the contaminated air. The resulting water saturated, cleansed air is mixed with a continuously regulated amount of drier outside air until a desired absolute humidity is achieved, the regulation being responsive to the relative humidity changes within a work area in which the humidity is to be controlled. The air mixture is then conveyed into the work area which imparts a known temperature rise thereto. The temperature rise lowers the relative humidity of the air mixture to the desired level.

9 Claims, 2 Drawing Figures

HUMIDITY CONTROL SYSTEM WITH APPARATUS FOR REMOVING COMBUSTIBLE DUST PARTICLES

BACKGROUND

Many industrial processes, such as sanding, grinding and milling generate high concentrations of dust particles in the surrounding air. Unchecked inhalation of such particles can damage the lungs of industrial employees breathing such contamined air. In addition, these particles present a fire hazard as well as a health hazard if the materials being processed are combustible in fine dust or powder form. A spark from a sanding belt, grinding wheel or static electricity can trigger explosive spontaneous combustion. Such explosions and fires have occurred in furniture plants and grain mills where high densities of fine sawdust or flour were allowed to contaminate the air.

Clearly a safe, efficient and economical means for cleansing such contaminated air is needed. The problem is not solved by a device which merely exhausts large volumes of the contaminated air from the factory into the outside air; local and national pollution laws prohibit this practice. These laws and other environmental considerations necessitate the use of some sort of filtering process which purifies the air instead of merely spewing it outside. In addition, it is desirable to incorporate some sort of humidity control process into the purification process, so that the relative humidity within the plant or factory is maintained at a comfortable level (40-50%) for the employees. Humidity control is especially desirable in wood working industries such as furniture plants, where a low relative humidity causes expensive wood to dry out and split.

SUMMARY

Though the separate inventions of air scrubbers and air humidifiers have been known in their respective arts for a long time, there has never been a previous combination that so effectively and inexpensively performs the function of both. One of the differences between the separate use of these two devices and the invention is the fact that in the invention the "scrubbed", purified air is mixed with an appropriate amount of outside air. This design difference results in an economy of operation previously unapproached by conventional air conditioning systems separately utilizing air scrubbers and air humidifiers. In addition, the air scrubber within the system of the present invention safely removes combustible dust particles from the contaminated air. A particle eliminator utilizing a mechanical filter process which accumulates fine, dry particles in a drum only increases the fire hazard by compressing and thus warming the contaminated air, while simultaneously increasing the density of the combustible particles in the filter area. By contrast, the wet filter process utilized in the high density air scrubber of the invention safely eliminates combustible dust particles by cooling the air and wetting the particles.

The air conditioning system according to the present invention pulls in dust contaminated air by means of a dust fan which in turn conveys it to a two-stage return air treatment means. The first stage is comprised of a conventional cyclone or preseparator unit which eliminates the heavier particles of the contaminated air, thus reducing the work load of the second stage air scrubber. A preferred preseparator embodiment is the highly efficient cyclonic separator described in applicant's co-pending patent application Ser. No. 506,936, filed Sept. 18, 1974. The cyclonic separator whirls the dust laden air around in a whirlpool-like configuration within a cylindrical container. Centrifugal force pulls the heavier particles against the container walls and gravity forces them to fall to the bottom of the container while the partially cleansed air is discharged through the top. It is desirable to insulate the preseparator so that moisture from the contaminated air will not condense on the preseparator walls, causing large aggregations to interfere with the efficient, economical operation of the invention.

The partially cleansed air then passes through an air vent which straightens the circular air current and reforms it into a linear stream, and sends it on to the air scrubber. The air scrubber forms the second stage of the return air treatment means. The semipurified air enters the spray chamber of the air scrubber where it is exposed to a fine water mist and becomes water saturated. The scrubber is preferably a high density, low velocity type air washer operating at a rate of no more than 600 feet per minute. Such a scrubber insures both the elimination of the particle and the water saturation of the air. Water droplets from the mist coalesce around the remaining fine dust particles. Gravity draws the water-laden dust particles to the bottom of the spray chamber, thus completing the purification process. The water saturated, purified air and excess water droplets are then conveyed through a conventional eliminator system having a series of closely spaced vent blades. The excess water droplets impinge on the blades where they form small rivulets which run down into a water reservoir, to be recycled through the spray chamber, leaving the air cleansed of dust powder and fully saturated.

If desired, the invention is compatible with a cooling system as well as a particle eliminator and humidity controller by installing a simple refrigeration device on the water reservoir. The resulting refrigerated mist will effectively cool the air in addition to eliminating dust particles and adding moisture.

The purified, water saturated air is carried into a mixing chamber where it is mixed with outside air in such proportions as determined by a humidistat operated damper system to obtain a desired absolute humidity in the mixture. The damper control system operates a mixing damper placed between the purified air and the mixing chamber, an exhaust damper which directs some or all of the purified air to the atmosphere, and an intake damper which conveys outside air into the mixing chamber. In addition a heating coil is placed in the incoming air stream to raise the temperature and thus the relative humidity of very cold outside air, so that it is compatible with the system. The humidistat controls the absolute humidity of the air in the mixing chamber by regulating the opening and closing of the three dampers to mix the saturated return air with the dryer outside air as needed. A thermostat device activates the heating coil in the incoming air path when the temperature of the outside air stream is low enough to cause moisture to condense out of the mixture of purified, saturated air and outside air.

The final step in the humidity control process occurs when the air mixture is conveyed into an enclosed work space which imparts an increase in temperature or a temperature rise to the air mixture. The humidistat regulates the absolute humidity of the mixture so that a desired relative humidity is achieved in the mixture after it experiences the increase in temperature associated with the enclosed space. A separate thermostat activates a second heating coil in the path of the air mixture when the temperature of the enclosed space is not higher than the temperature of the mixture. Hence, by regulating the air vents and heating coils, the invention controls the relative humidity of its end product.

One objective of the invention is the establishment of an air conditioning device which safely removes combustible dust particles from exhaust air and maintains the relative humidity of the air within a work area with a prescribed range by first saturating the purified exhaust air, then mixing it with prescribed, regulated quantities of outside air.

Another object of the invention is the establishment of an air conditioning device which eliminates dust particles from dust contaminated air and controls the humidity of the same in a substantially more efficient and economical manner than the separate use of dust eliminators and air humidifiers.

Yet another objective of the invention is to establish an efficient dust eliminating, humidity control system which may be safely used to eliminate high densities of combustible particles in the air thus substantially reducing fire hazards.

A still further object of the invention is the establishment of an air conditioning device which purifies dust contaminated air and controls the relative humidity of an enclosure by admixing saturated purified air with outside air, and which can be easily and economically adapted to control the temperature of the enclosure as well.

Figure 2:
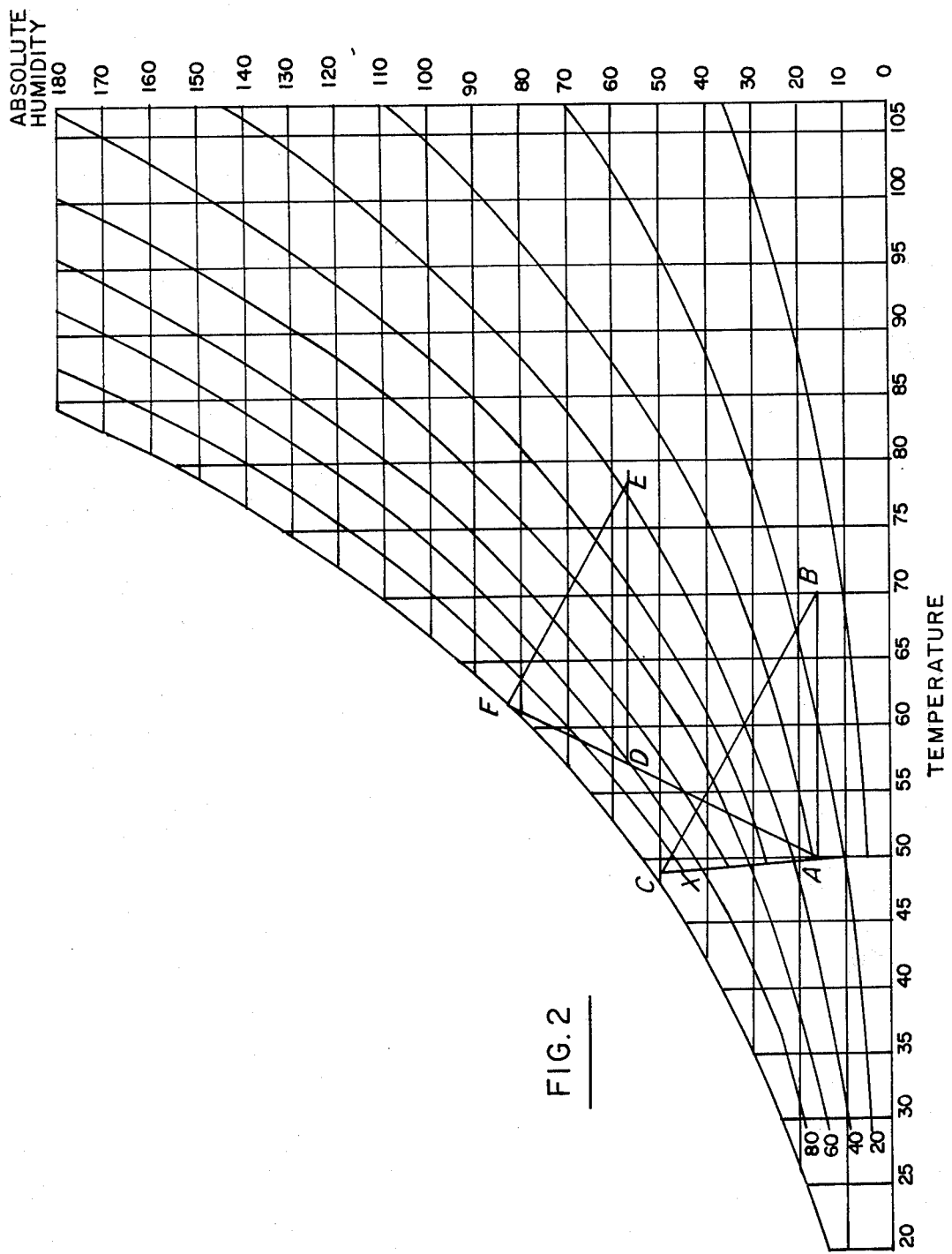

Other objects and advantages of the invention will be apparent from the following detailed description of a preferred embodiment thereof, reference being made to the accompanying drawing, in which:

FIG. 1 is a schematic representation of the system for conditioning air in accordance with the principles of the invention; and FIG. 2 is a simplified psychrometric chart to which reference will be made in the explanation of the invention.

The following detailed description of a working embodiment of the invention will explain the arrangement of devices, which in themselves are known. In general, the contaminated exhaust air from a work area is first subjected to a preseparator 3 where the heavy particles are removed. A high density, low velocity air scrubber 6 then introduces a fine water mist to the air stream, whereupon the fine, combustible particles become coalesced with the mist droplets and fall to the bottom where they are collected. The cleansed, saturated air is then mixed with outside, dryer air in proportions regulated by a humidistat within the work area to achieve a prescribed relative humidity within the work area.

Referring to FIG. 1, and more specifically, dust contaminated air is first removed from a work area W by means of a dust fan 1 and conveyed through a conduit C1, C2 to the intake vents 2 of the preseparator unit 3, the dust fan 1 and conduit C1, C2 forming a first conduit means. The preferred embodiment of the preseparator unit is a group of three insulated, highly efficient, cyclonic separators of the type described in applicant's co-pending patent application Ser. No. 506,936, filed Sept. 18, 1974. Centrifugal force throws the larger, heavier particles against the cylindrical walls of the three separators. Gravity forces them to fall to the bottom of the three cylinders where they accumulate and are periodically disposed of. The partially cleansed air which still contains the smaller, lighter, combustible dust particles is exhausted through the top of the cyclonic separators through a discharge cylinder. The preseparators should be insulated so that moisture from the contaminated air will not condense on the cylinder walls when the temperature of the air surrounding the preseparator is lower than the temperature of the contaminated air.

It should be noted that a preseparator unit such as the one just described is normally not essential to the functioning of the invention. Its primary purpose being to increase the efficiency of the system by removing the heavy particles from the air stream, thereby reducing both the work load of the air scrubber, as well as the possibility of damage inflicted by heavy particles.

After the semi-purified air is expelled from the top of the cyclonic separators, it passes through air foil 4, which straightens the whirlpool-like air flow pattern emerging from the cyclone into a colinear air stream. If the semi-purified air current was not straightened, the circular air stream emerging from the cyclone might blow the water spray from the adjacent air scrubber back to the outlet vents of the cyclonic separators, and all around the surrounding area. This unconfined water spray would in turn cause the dust particles to coagulate into large aggregations which would accumulate around the outlet area of the cyclonic separators. The semi-purified air finally flows through a coarse mesh screen 5 which filters out any large chunks or flakes of matter that may have escaped through the cyclones.

The semi-purified air then enters the air scrubber 6 where the water sprayers 7 in the chamber thereof expose the remaining dust particles to a dense water mist as described hereinabove. The high density, low velocity air scrubber 6 injects water mist into the spray chamber preferably at the rate of approximately 10 gallons of water per minute into a maximum air flow rate of 600 feet per minute. Stated otherwise the air stream receives approximately 0.14 pounds of water/cubic foot. Such a scrubber insures both the safe and effective removal of the remaining combustible dust particles as well as the water saturation of the purified air. The purified, saturated air and excess water droplets next pass through a water eliminator 8 of a conventional design comprising a series of closely spaced blades. The excess water droplets impinge and collect on the surface of these blades. Gravity causes the droplets to form small rivulets which run down the blade surfaces in a known manner. The water from these rivulets, along with the particle contaminated water from the bottom of the air scrubber drain into the drain holes 9 at the foot of the water eliminator 8 and into a reservoir. A pump 10 draws the particle contaminated water through a semi-porous filter 11 which eliminates the particles from the water and accumulates them for later disposal. The water pressure from the pump 10 recycles the purified water through the water sprayers 7. A water chiller may be utilized in conjunction with the reservoir to effect a cooling of the saturated air when outside conditioning necessitate such.

The purified, saturated air finally flows into a mixing chamber 22 through transfer vent 13 where it is mixed with a regulated amount of outside air drawn in through inlet vent 16 by means of a fan 27. The mixed air is then passed on to the work area through a second conduit means C3 which includes a fan 27. It should be understood that the amount of air admitted by vents 13 and 16 equals 100% of the air entering the work area W. Therefore if only part of the saturated air is to be used, the rest must be exhausted through vents 14. Toward this end humidistat 25 controls the incoming mixture responsive to the relative humidity in work area W by sending electrical or pneumatic signals to damper control motors M connected to the mixing control vents 13, 14 and 16. If the expected temperature rise in work area W does not impart sufficient heat to the mixture to bring the relative humidity down to the desired level, a thermostat 26 activates heating coil 23 which warms the air expelled through fan 24. This condition frequently occurs in the beginning of the day when the air warming industrial activity occurring inside the enclosed space has not been in operation long enough to effectively heat the surrounding air.

Further, if the outside air temperature is so low as to generate precipitation in the mixing chamber 22, as will be discussed hereinafter, thermostat 18 activates heating coil 19 which heats the incoming stream of outside air. Such precipitation inducing low temperatures occur frequently in the wintertime. Experience with the invention has shown that thermostat 18 should be adjusted to activate heating coil 19 when the outside air temperature is lower than 40°F. In addition to deterring unwanted precipitation, it should be noted that coil 19 serves the additional purpose of warming the air mixture to a more comfortable level in winter conditions. Thermostat 21 prevents the overheating of the outside air stream flowing into mixing chamber 22. Such overheating could occur when humidistat 25 adjusts the vents of 16 so that only a small volume of outside flows through coil 19. This over heating could impart an undesirably high temperature, low relative humidity to the mixture. Therefore thermostat 21 is adjusted to choke the steam valve heating coil 19 when the air stream leaving the coil is over approximately 60°F. Each of the heating coils 23 and 19 of this preferred embodiment have sufficient heat capacity to warm the air stream passing thereby by approximately 25°F.

Reference is now made to the pyschrometric chart of FIG. 2 in illustrating the manner in which the invention controls the humidity of the air mixture. Two general principals should be kept in mind while applying the chart to the operation of the invention. First, assuming no refrigeration or chilled water is added, the BTU's/lb. of the particle contaminated air collected from the work area is always greater than the BTU's/lb. of the outside air. If this condition does not occur naturally due to the electric lights, electric motors, and other heat generating industrial activity within the work area enclosed space, thermostat 26 activates heating coil 23 as previously described. Secondly, the absolute humidity of the purified, saturated air emerging from the water eliminator 8 is always greater than the absolute humidity of the outside air. This condition stems from the fact that the higher BTU contaminated air is saturated with water by the air scrubber, and thus will have greater absolute humidity even if the outside air is also saturated.

These two general conditions allow the invention to easily control the relative humidity within the work area. For the purposes of illustration, assume that the outside air temperature is 50°F and the relative humidity is 30% (point A, FIG. 2). Further assume that a relative humidity of at least 40% is desired in the work area. Assume that the temperature differential between the work area and outside air is 20° F. (point B, FIG. 2). Triangle ABC represents the initial humidification control cycle where all outside air is used. The outside air initially enters the work area at point A and is heated by the room to point B. The line from B to C represents the water saturation of the air by the air scrubber. The line from C to A represents the possible ranges of temperature and humidity the mixture can have. The humidistat in the room will initially choose a mixture comprised largely of the purified, saturated air (point X) which will have a 40% relative humidity when the temperature is increased 20°F. Thus the humidistat will send signals to the damper motors controlling vents 13, 14 and 16. Vent 13 will be open almost all the way; vents 14 and 16 will be substantially closed. As the relative humidity of the air in the enclosed space becomes higher due to the influx of the largely saturated air mixture, the humidification cycle approaches the equilibrium state represented by triangle DEF. In this example, the humidistat chooses such a mixture of saturated air and outside air at point D along line AF that the resulting mixture achieves the desired 40% relative humidity when heated the designated 20°F.

Other modifications of the invention will be apparent to those skilled in the art after reading the above description and viewing the accompanying drawings. For example the contaminated air from one work area may be collected, filtered, saturated, mixed and introduced to another area to control the humidity therein. It is to be understood that such modifications can be employed without departing from the spirit and scope of the invention.

What is claimed is:

1. Apparatus for safely removing combustible dust particles from a contaminated return air stream leaving an enclosed, heat-imparting work area, and at the same time maintaining a desired relative humidity within said work area comprising:
   a. a return air treatment means for receiving and treating a contaminated return air stream including combustible particles therein;
   b. a fan means for withdrawing said contaminated return air from a work area and delivering it to said air treatment means;
   c. a means downstream of said return air treatment means for drawing in fresh outside air to said apparatus;
   d. a mixing chamber downstream of said air treatment means including a vent means in the air path of both the air leaving said return air treatment means and the entering outside air;
   e. said return air treatment means including a scrubber means for introducing a water mist into all of said return air to both saturate said return air as well as to safely coalesce with said combustible particles, causing them to fall from the saturated return air;
   f. means for sensing the humidity in said work area and means for controlling said vent means to selectively interrupt the flow of saturated air from said return air treatment means and said entering outside air and introducing controlled amounts of clean, saturated return air and fresh, outdoor air to said mixing chamber in response to said sensed humidity; and
   g. first conduit means connecting said work area with said return air treatment means and a second conduit means connecting said mixing chamber with said work area.

2. The apparatus according to claim 1 wherein said vent means further includes an exhaust vent in the air path of air leaving said return air treatment means, said control means further controlling said exhaust vent in response to said sensed humidity, said exhaust vent and said vent means cooperating with each other and operated responsive to said humidity sensing means to exhaust a prescribed amount of saturated air to the outside, to pass a prescribed amount of said saturated air to the mixing chamber, and to pass a prescribed amount of outside air to said mixing chamber.

3. The apparatus according to claim 2 wherein said vent means in the air path of said entering outside air further includes a heating means for preheating the incoming air prior to being mixed with said saturated air.

4. The apparatus according to claim 1 wherein said air treatment means further includes a cyclonic separator upstream of said scrubber means for removing heavy particles from said return air, and a moisture eliminator downstream of said scrubber means for removing excess moisture from said return air.

5. The apparatus according to claim 1 wherein said scrubber means introduces approximately 0.14 pounds of water per cubic foot of air to insure both the safe and effective removal of combustible particles as well as saturation of the return air.

6. Method for maintaining the humidity of air within an enclosed, heat-imparting work area while removing combustible dust particles from contaminated return air removed therefrom comprising the steps of:

a. collecting said contaminated air from said work area and moving it through a conduit to a return air treating apparatus;
b. spraying a fine water mist into all of the dust contaminated return air to simultaneously saturate the air with moisture and to coalesce the combustible dust particles with water droplets;
c. separating said water droplets from the saturated air;
d. mixing a prescribed, regulated portion of the resulting purified, water saturated air with a prescribed, regulated quantity of outside air;
e. conveying the air mixture obtained in step (d) to said work area where said air mixture undergoes a predetermined temperature rise to reduce the relative humidity to a desired level;
f. the relative amount of return air and outside air used in said mixing step being automatically determined responsive to the existing relative humidity of said work area to thereby achieve a desired relative humidity when the mixture is heated in said work area.

7. The method according to claim 6 wherein said incoming outside air is selectively heated prior to being mixed with said saturated air.

8. The method according to claim 6 wherein said mixture obtained from step (d) is selectively heated to achieve said predetermined temperature rise at times when machinery in said work area is otherwise inactive and thereby not achieving said predetermined temperature rise.

9. The method according to claim 6 wherein said fine water mist is introduced at a rate of approximately 0.14 pounds of water per cubic foot of air.

* * * * *